(12) United States Patent
Sato et al.

(10) Patent No.: US 11,034,836 B2
(45) Date of Patent: Jun. 15, 2021

(54) RESIN COMPOSITION, MOLDED ARTICLE AND METHOD FOR MANUFACTURING MOLDED ARTICLE

(71) Applicant: Mitsubishi Gas Chemical Company, Inc., Tokyo (JP)

(72) Inventors: Kazuya Sato, Hiratsuka (JP); Tomonori Kato, Hiratsuka (JP); Jin Nakamura, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 196 days.

(21) Appl. No.: 16/461,657

(22) PCT Filed: Nov. 6, 2017

(86) PCT No.: PCT/JP2017/039902
§ 371 (c)(1),
(2) Date: May 16, 2019

(87) PCT Pub. No.: WO2018/092623
PCT Pub. Date: May 24, 2018

(65) Prior Publication Data
US 2019/0352505 A1    Nov. 21, 2019

(30) Foreign Application Priority Data

Nov. 18, 2016 (JP) .............................. JP2016-224765
Sep. 20, 2017 (JP) .............................. JP2017-179715

(51) Int. Cl.
| | |
|---|---|
| C08L 77/06 | (2006.01) |
| B29C 48/15 | (2019.01) |
| B32B 27/08 | (2006.01) |
| C08K 5/134 | (2006.01) |
| C08L 23/26 | (2006.01) |

(52) U.S. Cl.
CPC .............. *C08L 77/06* (2013.01); *B29C 48/15* (2019.02); *B32B 27/08* (2013.01); *C08K 5/1345* (2013.01); *C08L 23/26* (2013.01)

(58) Field of Classification Search
CPC ....................................................... C08L 77/06
See application file for complete search history.

(56) References Cited

U.S. PATENT DOCUMENTS

| | | | | |
|---|---|---|---|---|
| 10,662,303 | B2 * | 5/2020 | Otsuka .................... | C08G 69/26 |
| 2002/0128386 | A1 * | 9/2002 | Montanari ............... | C08L 77/02 |
| | | | | 525/66 |
| 2010/0227962 | A1 * | 9/2010 | Vergelati ................. | C08L 77/00 |
| | | | | 524/447 |
| 2014/0017432 | A1 | 1/2014 | Doshi | |
| 2016/0032099 | A1 | 2/2016 | Sato et al. | |
| 2016/0193813 | A1 | 7/2016 | Sato et al. | |
| 2016/0312027 | A1 | 10/2016 | Minagawa et al. | |
| 2018/0171142 | A1 | 6/2018 | Otsuka et al. | |
| 2018/0201744 | A1 | 7/2018 | Otsuka et al. | |

FOREIGN PATENT DOCUMENTS

| | | | |
|---|---|---|---|
| CN | 105121551 A | 12/2015 | |
| CN | 105451992 A | 3/2016 | |
| DE | 3312936 A1 * | 10/1983 | .............. C08L 77/00 |
| EP | 3239238 A1 | 11/2017 | |
| EP | 3385074 A1 | 10/2018 | |
| JP | H08-325451 A | 12/1996 | |
| JP | H10-292105 A | 11/1998 | |
| JP | 2001-302908 A | 10/2001 | |
| JP | 2017-052819 A | 3/2017 | |
| WO | 2015/093060 A1 | 6/2015 | |
| WO | 2017/010389 A1 | 1/2017 | |
| WO | 2017/010390 A1 | 1/2017 | |

OTHER PUBLICATIONS

English machine translation of Yamamiya et al. (DE 3312936) (Year: 1983).*
Extended European Search Report issued in corresponding European Application No. 17871510.8 dated Nov. 12, 2019 (6 pages).
International Preliminary Report on Patentability and Written Opinion for PCT/JP2017/039902, dated Jan. 23, 2018, and English Translation submitted herewith (8 pages.).
International Search Report for PCT/JP2017/039902, dated Jan. 23, 2018, and English Translation submitted herewith (5 pages).
Office Action dated Nov. 27, 2020, in corresponding Chinese Patent Application No. 201780070723.0.

* cited by examiner

*Primary Examiner* — Michael F Pepitone
(74) *Attorney, Agent, or Firm* — Fitch, Even, Tabin & Flannery LLP

(57) ABSTRACT

Provided is a resin composition which comprises 100 parts by weight of a polyamide resin comprising a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms; 3 to 17 parts by weight of an acid-modified polyolefin having an acid modification ratio of 0.3 to 5.0% by weight; and 1 to 15 parts by weight of a compound represented by formula (1), wherein $R^1$ represents an alkyl group having 1 to 10 carbon atoms, $R^2$ represents an alkyl group having 2 to 12 carbon atoms, and n represents an integer of 1 to 3.

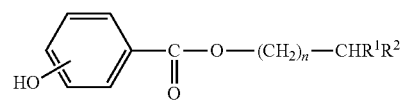

26 Claims, 1 Drawing Sheet

(a)
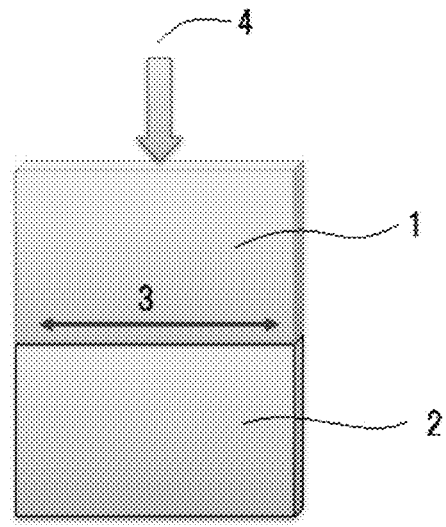
(b)
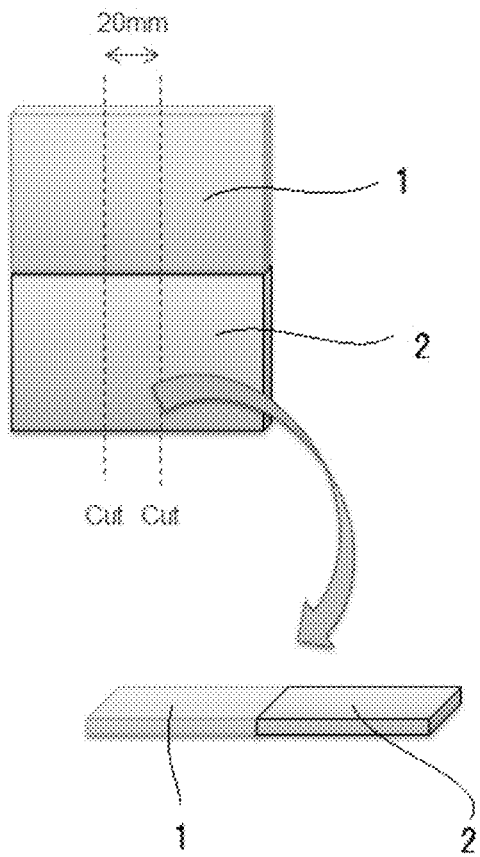

RESIN COMPOSITION, MOLDED ARTICLE AND METHOD FOR MANUFACTURING MOLDED ARTICLE

CROSS-REFERENCE TO RELATED APPLICATIONS

This application is a U.S. national phase application filed under 35 U.S.C. § 371 of International Application Number PCT/JP2017/039902, filed Nov. 6, 2017, designating the United States, which claims priority from Japanese Application Number 2017-179715, filed Sep. 20, 2017, and Japanese Application Number 2016-224765, filed Nov. 18, 2016.

FIELD OF THE INVENTION

This invention relates to a resin composition, a molded article and a method for manufacturing a molded article, and in particular to a resin composition capable of providing a molded article that excels in oxygen barrier performance and impact resistance.

BACKGROUND OF THE INVENTION

Polyamide resin has been widely used for various applications, for its excellent chemical resistance, heat resistance and so forth.

For example, Patent Literature 1 describes a polyamide composition for blow molding, which includes a polyamide containing at least an amine-terminated polyamide having a ratio of terminal amino group and terminal carboxy group of 100:0 to 50:50, and a modified polyolefin. The literature also describes that the amine-terminated polyamide is polyamide 11 or polyamide 12, and that the modified polyolefin is an epoxy-modified, or acid anhydride-modified, or carboxylic acid-modified polyolefin. The literature further describes that that the polyamide composition excels in Izod impact strength.

CITATION LIST

Patent Literature

[Patent Literature 11] JP-A-2001-302908

SUMMARY OF THE INVENTION

The present inventors, however, found from our investigations into Patent Literature 1 that the composition excels in impact resistance but is inferior in oxygen barrier performance.

Use of a polyamide resin even with good oxygen barrier performance may pose a problem, if the impact resistance is poor.

It is therefore an object of this invention to solve the problem, and to provide a resin composition that excels in oxygen barrier performance and impact resistance, and, a molded article using the resin composition, as well as a method for manufacturing a molded article.

Considering the aforementioned problem, the present inventors found from our investigations that a molded article that excels in oxygen barrier performance and is remarkably improved in the impact resistance is obtainable, by blending a predetermined xylylenediamine-based polyamide resin with an acid-modified polyolefin having an acid modification ratio of 0.3 to 5.0% by weight, as well as with a compound represented by formula (1), which drove us to complete this invention. More specifically, the aforementioned problem was solved by means <1> below, and preferably by means <2> to <14> below.

<1> A resin composition comprising:
100 parts by weight of a polyamide resin comprising a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms;
3 to 17 parts by weight of an acid-modified polyolefin having an acid modification ratio of 0.3 to 5.0% by weight; and
1 to 15 parts by weight of a compound represented by formula (1) below; Formula (1)

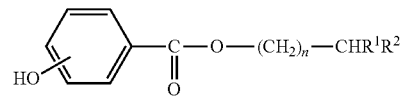

wherein $R^1$ represents an alkyl group having 1 to 10 carbon atoms, $R^2$ represents an alkyl group having 2 to 12 carbon atoms, and n represents an integer of 1 to 3.

<2> The resin composition of <1>, wherein the xylylenediamine contains at least one of metaxylylenediamine or paraxylylenediamine.

<3> The resin composition of <1> or <2>, wherein the straight-chain aliphatic α,ω-dicarboxylic acid having 4 to 20 carbon atoms contains at least one of sebacic acid and adipic acid.

<4> The resin composition of any one of <1> to <3>, wherein the compound represented by formula (1) and the acid-modified polyolefin having an acid modification ratio of 0.3 to 5% by weight satisfy a weight ratio of 3:10 to 16:10.

<5> The resin composition of any one of <1> to <4>, wherein the acid-modified polyolefin contains at least one of maleic acid-modified polyolefin and maleic anhydride-modified polyolefin.

<6> The resin composition of any one of <1> to <5>, wherein the polyamide resin contains:
10 to 90 parts by weight of a polyamide resin, in which 70 mol % or more of the structural unit derived from dicarboxylic acid is derived from adipic acid; and
90 to 10 parts by weight of a polyamide resin, in which 70 mol % or more of the structural unit derived from dicarboxylic acid is derived from sebacic acid.

<7> The resin composition of any one of <1> to <6>, being a covering material for a core.

<8> A molded article obtained by molding the resin composition of any one of <1> to <7>.

<9> A molded article comprising a core and a covering layer for the core, the covering layer being formed from the resin composition of any one of <1> to <5>.

<10> The molded article of <9>, further comprising a second covering layer which is in contact with the covering layer, and contains an aliphatic polyamide resin as a major ingredient.

<11> The molded article of <10>, wherein the aliphatic polyamide resin is polyamide 12.

<12> The molded article of <10> or <11>, wherein the polyamide resin that composes the covering layer contains:

10 to 90 parts by weight of a polyamide resin, in which 70 mol % or more of the structural unit derived from dicarboxylic acid is derived from adipic acid; and 90 to 10 parts by weight of a polyamide resin, in which 70 mol % or more of the structural unit derived from dicarboxylic acid is derived from sebacic acid.

<13> The molded article of any one of <9> to <12>, wherein the core is an optical waveguide or a continuous hollow article.

<14> A method for manufacturing a molded article comprising covering a core with the resin composition described in any one of <1> to <7>.

According to this invention, it now became possible to provide a resin composition that excels in oxygen barrier performance and impact resistance, and, a molded article using the resin composition, as well as a method for manufacturing a molded article.

BRIEF DESCRIPTION OF DRAWINGS

FIG. 1 A schematic drawing illustrating a method for evaluating adhesiveness in Examples.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

The resin composition of this invention includes:

100 parts by weight of a polyamide resin that includes a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms (may occasionally be referred to as "XD-based polyamide resin", hereinafter);

3 to 17 parts by weight of an acid-modified polyolefin having an acid modification ratio of 0.3 to 5.0% by weight; and 1 to 15 parts by weight of a compound represented by formula (1) below:

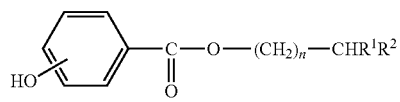

Formula (1)

in formula (1), $R^1$ represents an alkyl group having 1 to 10 carbon atoms, $R^2$ represents an alkyl group having 2 to 12 carbon atoms, and n represents an integer of 1 to 3.

With such design, the obtainable resin composition (molded article) will have excellent oxygen barrier performance and excellent impact resistance. The obtainable resin composition also will have good coverage.

Now, the XD-based polyamide resin has been known to excel in oxygen barrier performance, but has not always been sufficient in terms of impact resistance. This invention surprisingly succeeded in remarkably improving the impact resistance, by blending the XD-based polyamide resin with an acid-modified polyolefin, as well as with a compound represented by formula (1) above. More specifically, there has been a known practice to blend the acid-modified polyolefin, aiming at improving the impact resistance of polyamide resin. The present inventors, however, found from our investigation that the XD-based polyamide resin, simply blended with an acid-modified polyolefin, occasionally failed in achieving a sufficient level of impact resistance. Meanwhile this invention succeeded in remarkably increasing the impact resistance, by controlling the acid modification ratio of acid-modified polyolefin within a predetermined range, and by adding the compound represented by formula (1). It is a matter of particular surprise that the impact resistance can be remarkably improved by adding the compound represented by formula (1).

This invention can also improve the coverage. Hence the resin composition of this invention may suitably be used for a covering material.

This invention will be detailed below.

<XD-Based Polyamide Resin>

The polyamide resin (XD-based polyamide resin) used in this invention includes a structural unit derived from diamine and a structural unit derived from dicarboxylic acid, wherein 70 mol % or more of the structural unit derived from diamine is derived from xylylenediamine, and 70 mol % or more of the structural unit derived from dicarboxylic acid is derived from straight-chain aliphatic α,ω-dicarboxylic acid having 4 to 20 carbon atoms.

In the XD-based polyamide resin, preferably 80 mol % or more of the structural unit derived from diamine is derived from at least one xylylenediamine, which is more preferably 90 mol % or more, even more preferably 95 mol % or more, and yet more preferably 98 mol % or more; meanwhile preferably 80 mol % or more of the structural unit derived from dicarboxylic acid is derived from at least one straight-chain aliphatic α,ω-dicarboxylic acid having 4 to 20 carbon atoms, which is more preferably 90 mol % or more, even more preferably 95 mol % or more, and yet more preferably 98 mol % or more.

That is, xylylenediamine as a starting material of the XD-based polyamide resin preferably contains at least one of metaxylylenediamine or paraxylylenediamine, from the viewpoint of oxygen barrier performance, and more preferably contains at least metaxylylenediamine.

Further from the viewpoint of coverage, the xylylenediamine preferably includes 30 to 100 mol % of metaxylylenediamine and 0 to 70 mol % of paraxylylenediamine, more preferably includes 60 to 100 mol % of metaxylylenediamine and 0 to 40 mol % of paraxylylenediamine, and even more preferably include 70 to 100 mol % of metaxylylenediamine and 0 to 30 mol % of paraxylylenediamine.

The xylylenediamine used in this invention preferably contains 90 mol % or more of metaxylylenediamine, which is more preferably 95 mol % or more, and even more preferably 98 mol % or more. With such design, the coverage will be improved more effectively.

Diamines employable as a starting diamine for the XD-based polyamide resin, but other than xylylenediamine, are exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis (aminomethyl)tricyclodecane; and aromatic ring-containing diamines such as bis(4-aminophenyl)ether, paraphenylenediamine, and bis(aminomethyl)naphthalene, all of which may be used independently, or two or more of them may be used in a mixed manner.

When the diamine other than xylylenediamine is used, the amount of consumption is 30 mol % or less of the structural unit derived from diamine, more preferably 1 to 25 mol %, and particularly 5 to 20 mol %.

The straight-chain aliphatic $w\alpha,\omega$-dicarboxylic acid having 4 to 20 carbon atoms, employable as a starting dicarboxylic acid for the XD-based polyamide resin, is preferably straight-chain aliphatic $c\alpha,\omega$-dicarboxylic acid having 6 to 16 carbon atoms, and more preferably straight-chain aliphatic $\alpha,\omega$-dicarboxylic acid having 6 to 10 carbon atoms. The straight-chain aliphatic $\alpha,\omega$-dicarboxylic acid having 4 to 20 carbon atoms is exemplified by aliphatic dicarboxylic acids such as succinic acid, glutaric acid, pimelic acid, suberic acid, azelaic acid, adipic acid, sebacic acid, undecanedioic acid, and dodecanedioic acid, all of which may be used independently, or two or more of them may be used in a mixed manner. Among them, at least one of adipic acid or sebacic acid is preferably contained, since the polyamide resin will have the melting point within a range suitable for molding.

The resin composition will be obtainable with still better oxygen barrier performance, when adipic acid is used as the straight-chain aliphatic $\alpha,\omega$-dicarboxylic acid having 4 to 20 carbon atoms.

The resin composition will be obtainable with still better impact resistance, when sebacic acid is used as the straight-chain aliphatic $\alpha,\omega$-dicarboxylic acid having 4 to 20 carbon atoms.

The resin composition will be obtainable with better adhesiveness to the aliphatic polyamide resin, when both of adipic acid and sebacic acid are used as the straight-chain aliphatic $\alpha,\omega$-dicarboxylic acid having 4 to 20 carbon atoms. In such polyamide resin (XD6/XD10), the molar ratio of adipic acid component and sebacic acid component is preferably 10:90 to 90:10, more preferably 30:70 to 90:10, and even more preferably 50:50 to 80:20.

Dicarboxylic acid component, other than the straight-chain aliphatic $\alpha,\omega$-dicarboxylic acid having 4 to 20 carbon atoms, is exemplified by phthalic acid compounds such as isophthalic acid, terephthalic acid, and orthophthalic acid; and naphthalenedicarboxylic acid including isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid, all of which may be used independently, or two or more of them may be used in a mixed manner.

The dicarboxylic acid other than the straight-chain aliphatic $\alpha,\omega$-dicarboxylic acid having 4 to 20 carbon atoms, when used as the dicarboxylic acid component, is preferably terephthalic acid or isophthalic acid taking moldability and barrier performance into consideration. Ratio of terephthalic acid or isophthalic acid is preferably 30 mol % or less of the structural unit derived from dicarboxylic acid, more preferably within the range from 1 to 30 mol %, and particularly from 5 to 20 mol %.

Now, the phrase " . . . includes a structural unit derived from diamine and a structural unit derived from dicarboxylic acid" means that an amide bond that composes the XD-based polyamide resin is formed by combining a dicarboxylic acid and a diamine. The XD-based polyamide resin also contains other moiety such as terminal group, besides the structural unit derived from dicarboxylic acid and the structural unit derived from diamine. In some cases, the resin would contain a repeating unit having an amide bond which is not derived from binding between dicarboxylic acid and diamine, or would contain a trace amount of impurities. More specifically, besides the diamine component and the dicarboxylic acid component, the XD-based polyamide resin can employ copolymerizable components for composing the polyamide resin such as lactams exemplified by ε-caprolactam and laurolactam, and aliphatic aminocarboxylic acids exemplified by aminocaproic acid and aminoundecanoic acid, without adversely affecting the effects of this invention. In this invention, the structural unit derived from diamine or the structural unit derived from dicarboxylic acid preferably accounts for 90% by weight or more, and more preferably 95% by weight or more of the XD-based polyamide resin.

The XD-based polyamide resin used in this invention preferably has a number-average molecular weight (Mn) of 6,000 to 30,000, which is more preferably 8,000 to 28,000, and even more preferably 9,000 to 26,000. Within these ranges, the moldability will be improved.

Now the number-average molecular weight (Mn) herein is calculated based on terminal amino group concentration [$NH_2$](microequivalent/g) and terminal carboxy group concentration [COOH] (microequivalent/g) of the polyamide resin, using the equation below:

$$\text{Number-average molecular weight (Mn)} = 2{,}000{,}000/([COOH]+[NH_2])$$

Regarding a method for manufacturing the XD-based polyamide resin, description in paragraphs [0052] and [0053] of JP-A-2014-173196 may be taken into account, the content of which is incorporated by reference into this specification.

In this invention, the XD-based polyamide resin preferably has a melting point of 150 to 350° C., which is more preferably 180 to 300° C., and even more preferably 180 to 280° C.

Now the melting point in the context of this invention is given by the temperature at which an endothermic peak, observed during temperature elevation in DSC (differential scanning calorimetry), reaches the bottom. In practice, the melting point may be measured using "DSC-60" from Shimadzu Corporation, approximately 1 mg of sample, and nitrogen gas as an atmospheric gas fed at 30 mL/min, by heating the polyamide resin at a heating rate of 10° C./min from room temperature up to a temperature not lower than an expected melting point, rapidly cooling the molten polyamide resin on dry ice, then heating it again at a heating rate of 10° C./min up to a temperature not lower than the melting point, and finding the temperature at which the endothermic peak that appears in this process reaches the bottom.

For the case where two or more types of XD-based polyamide resins are contained in the resin composition of this invention, the melting point of polyamide resin is represented by the temperature at which the endothermic peak, observed at maximum temperature in the aforementioned DSC, reaches the bottom.

The ratio of XD-based polyamide resin in the resin composition of this invention is 50% by weight or more, preferably 60% by weight or more, even more preferably 70% by weight or more, and even may be 80% by weight or more.

The resin composition of this invention may contain only a single type of XD-based polyamide resin, or may contain two or more types. When two or more types are contained, the total content preferably falls within the above-descried ranges.

<Other Polyamide Resin>

The resin composition of this invention may contain polyamide resin other than the XD-based polyamide resin. Such other polyamide resin is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyamide 9T, polyamide 9MT, and polyamide 6I/6T.

The content of such other polyamide resin, when used, in the resin composition of this invention is preferably 1 to 50 parts by weight per 100 parts by weight of the XD-based polyamide resin, which is more preferably 5 to 40 parts by weight.

The resin composition of this invention may alternatively be designed to contain substantially no such other polyamide resin other than the XD-based polyamide resin. The phrase "contains substantially no . . . " means that the ratio of such other polyamide resin, out of the polyamide resins contained in the resin composition of this invention, is 5% by weight or less of the XD-based polyamide resin, preferably 3% by weight or less, and more preferably 1% by weight or less.

<Acid-Modified Polyolefin>

The resin composition of this invention contains the acid-modified polyolefin having an acid modification ratio of 0.3 to 5.0% by weight.

The acid modification ratio is preferably 0.4% by weight or above at minimum, which is more preferably 0.5% by weight or above, even more preferably 0.6% by weight or above, yet more preferably 0.8% by weight or above, and furthermore preferably 0.9% by weight or above. Within these ranges, the impact resistance may be improved more effectively. Meanwhile, the acid modification ratio is preferably 4.0% by weight or below at maximum, more preferably 3.0% by weight or below, even more preferably 2.5% by weight or below, and yet more preferably 1.8% by weight or below. Within these ranges, the resin composition of this invention, when used as the covering material (covering layer of molded article), will have improved melt elongation, making it possible to further equalize the thickness of the covering layer.

The ratio of modification by acid derivative in this invention may be measured by a method described later in EXAMPLES.

The acid-modified polyolefin used in this invention is obtained by modifying polyolefin with an acid. Acid modification means that an acid derivative is allowed to react with polyolefin in some way. More specifically, the acid-modified polyolefin used in this invention is obtained by grafting the acid derivative onto the principal chain of polyolefin, or by introducing the acid derivative into the principal chain of polyolefin. In this invention, the polyolefin is preferably a graft polymer having the acid derivative grafted onto the principal chain of polyolefin.

The acid derivative is preferably acid or acid anhydride, preferably unsaturated carboxylic acid or unsaturated carboxylic anhydride, and more preferably unsaturated carboxylic anhydride. The unsaturated carboxylic acid is preferably unsaturated dicarboxylic acid, and also the unsaturated carboxylic anhydride is preferably unsaturated dicarboxylic anhydride.

The acid derivative is more preferably maleic acid, maleic anhydride, itaconic acid, itaconic anhydride, 5-norbornene-2,3-dicarboxylic acid, 5-norbornene-2,3-dicarboxylic anhydride, endic acid, endic anhydride, citraconic acid, citraconic anhydride, 1-butene-3,4-dicarboxylic acid, or 1-butene-3,4-dicarboxylic anhydride, even more preferably maleic acid or maleic anhydride, and yet more preferably maleic anhydride.

Methods for modifying the copolymer with the acid derivative may be any of known methods without special limitation, and may typically be a method by which the acid derivative is co-polymerized with a starting monomer of the copolymer, or a method by which the acid derivative is grafted onto the copolymer. Note that, in the resin composition in this invention, the XD-based polyamide resin would occasionally be bound with the acid-modified polyolefin.

The acid-modified polyolefin is preferably a product resulted from acid modification of a copolymer which includes an ethylene-derived structural unit and a structural unit derived from α-olefin having 3 to 20 carbon atoms. With such design, the impact resistance may be improved more effectively.

The α-olefin having 3 to 20 carbon atoms is preferably α-olefin having 3 to 10 carbon atoms, more preferably α-olefin having 3 to 8 carbon atoms, even more preferably α-olefin having 3 to 5 carbon atoms, and yet more preferably α-olefin having 3 or 4 carbon atoms. Specific examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, l-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. Propylene and 1-butene are preferable.

The copolymer which includes the ethylene-derived structural unit and the structural unit derived from α-olefin having 3 to 20 carbon atoms may contain only a single type of, or two or more types of repeating unit derived from α-olefin having 3 to 20 carbon atoms. The copolymer may be a random polymer or a block polymer. The copolymer preferably contains 6 to 25 mol % of the structural unit derived from α-olefin having 3 to 20 carbon atoms, relative to the total structural units, wherein the ratio is more preferably 8 to 22 mol %, and even more preferably 10 to 20 mol %. With such design, the impact resistance may be improved more effectively.

The copolymer preferably contains 94 to 75 mol % of the ethylene-derived structural unit, relative to the total structural units, wherein the ratio is more preferably 92 to 78 mol %, and even more preferably 90 to 80 mol %.

The copolymer may further contain a structural unit other than the ethylene-derived structural unit and the structural unit derived from α-olefin having 3 to 20 carbon atoms. When the acid-modified polyolefin used in this invention contains such other structural unit, the content is preferably 10 mol % or less relative to the total structural units of the copolymer.

Specific examples of the copolymer include ethylene/propylene copolymer, ethylene/butene-1 copolymer, ethylene/hexene-1 copolymer, ethylene/propylene/dicyclopentadiene copolymer, and ethylene/propylene/5-ethylidene-2-norbornene copolymer.

Commercial products of the acid-modified polyolefin employable in this invention are exemplified by TAFMER (trade name, graft polymer) from Mitsui Chemicals, Inc., Fusabond (trade name) from DuPont, and AMPLIFY (trade name) from Dow.

The resin composition of this invention contains 3 to 17 parts by weight of the acid-modified polyolefin having an acid modification ratio of 0.3 to 5.0% by weight, per 100 parts by weight of the XD-based polyamide resin. The amount of mixing of the acid-modified polyolefin is preferably 4 parts by weight or above at minimum, per 100 parts by weight of the XD-based polyamide resin, which is more preferably 5 parts by weight or above, even more preferably 6 parts by weight or above, yet more preferably 7 parts by weight or above, and furthermore preferably 9 parts by weight or above. Meanwhile the amount of addition of the acid-modified polyolefin is preferably 16 parts by weight or below at maximum, per 100 parts by weight of the XD-based polyamide resin. Within these ranges, effects of this invention will be demonstrated more effectively.

The resin composition of this invention may contain only a single type, or two or more types, of the acid-modified polyolefin. When two or more types are contained, the total content preferably falls within the above-described ranges.

The resin composition of this invention may contain a polyolefin other than the acid-modified polyolefin having an acid modification ratio of 0.3 to 5.0% by weight, but preferably contains substantially no such other polyolefin. The phrase "contains substantially no . . . " means that the content of such other polyolefin, out of the polyolefins contained in resin composition of this invention, accounts for 5% by weight or below.

<Other Thermoplastic Resin>

The resin composition of this invention may contain still other thermoplastic resin, other than the above-described polyamide resin, such other polyamide resin, and acid-modified polyolefin having an acid modification ratio of 0.3 to 5.0% by weight. Specific examples of such other thermoplastic resin include polyphenylene ether resin, polystyrene resin, thermoplastic polyester resin, polyacetal resin, polyurethane resin, polylactide resin, and polyphenylene sulfide resin.

The ratio of mixing of such other thermoplastic resin, when used in the resin composition of this invention, is preferably within the range from 5 to 20% by weight of the resin component. In another possible design, substantially no such other thermoplastic resin is contained. The phrase "substantially no . . . is contained" means that the content of such other thermoplastic resin, out of the resin component contained in the resin composition of this invention, is 5% by weight or below.

<Compound Represented by Formula (1)>

The resin composition of this invention contains the compound represented by formula (1):

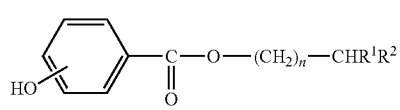

Formula (1)

in formula (1), $R^1$ represents an alkyl group having 1 to 10 carbon atoms, $R^2$ represents an alkyl group having 2 to 12 carbon atoms, and n represents an integer of 1 to 3.

In the compound represented by formula (1), OH group may be bound to any of the ortho position, para position and meta position, wherein the para position or ortho position is preferable, and the para position is more preferable.

In the compound represented by formula (1), n is preferably 1 or 2, and more preferably 1.

The number of carbon atoms of the alkyl group represented by $R^1$ in formula (1) is preferably 2 or above at minimum, more preferably 3 or above, even more preferably 4 or above, and yet more preferably 5 or above. Meanwhile the number of carbon atoms of the alkyl group represented by $R^1$ is preferably 9 or below at maximum, more preferably 8 or below, even more preferably 7 or below, and yet more preferably 6 or below. The alkyl group given by $R^1$ is preferably a straight-chain or branched alkyl group, and more preferably a straight-chain alkyl group. With such design, the impact resistance tends to be improved further.

In the compound represented by formula (1), the number of carbon atoms of the alkyl group represented by $R^2$ is 3 or above at minimum, more preferably 5 or above, even more preferably 6 or above, and yet more preferably 7 or above. Meanwhile the number of carbon atoms of the alkyl group represented by $R^2$ is 11 or below at maximum, more preferably 10 or below, and even more preferably 9 or below. The alkyl group given by $R^2$ is preferably a straight-chain or branched alkyl group, and more preferably a straight-chain alkyl group. With such design, the impact resistance tends to be improved further.

In the compound represented by formula (1) in this invention, the number of carbon atoms composing $R^2$ is preferably two or more larger than the number of carbon atoms composing $R^1$, and is more preferably 2 to 4 larger. With such design, the impact resistance tends to be improved further.

Examples of the compound represented by formula (1) will be shown below. Note however that this invention is of course not limited thereto.

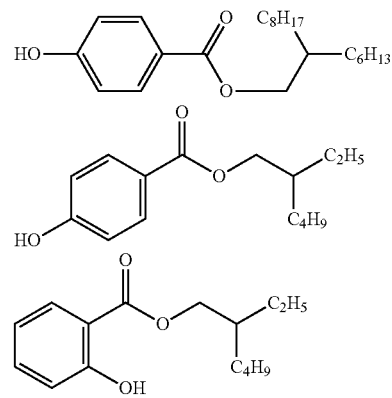

The resin composition of this invention contains 1 to 15 parts by weight of the compound represented by formula (1) per 100 parts by weight of the XD-based polyamide resin. The compound represented by formula (1) preferably accounts for 4 parts by weight or above at minimum, more preferably 5 parts by weight or above, even more preferably 6 parts by weight or above, and yet more preferably 7 parts by weight or above. Meanwhile the compound preferably accounts for 14 parts by weight or below at maximum.

The compound represented by formula (1) may be a single type, or two or more types. When two or more types are contained, the total content preferably falls within the ranges described above.

In the resin composition of this invention, ratio by weight of the compound represented by formula (1) and the acid-modified polyolefin having an acid modification ratio of 0.3 to 5% by weight preferably falls within the range from 3:10 to 16:10, more preferably from 3:10 to 13:10, even more preferably from 4:10 to 13:10, and yet more preferably 5:10 to 13:10. Within these ranges, the oxygen barrier performance and the impact resistance will further be improved while being balanced well.

<Other Additives>

The resin composition of this invention allows for addition of additives such as filler, stabilizers such as antioxidant and heat stabilizer, hydrolysis resistance modifier, weathering stabilizer, matting agent, UV absorber, nucleating agent, plasticizer, dispersion aid, flame retardant, antistatic agent, anticoloring agent, antigelling agent, coloring agent, mold releasing agent and lubricant, so long as the purposes and effects of this invention will not be adversely affected. For details of the additives, descriptions in paragraphs [0130] to [0155] of JP-B1-4894982 may be taken into account, the contents of which are incorporated by reference into this specification.

While the compound represented by formula (1) may occasionally be used as a plasticizer for resin composition, the resin composition of this invention preferably contains substantially no plasticizer other than the compound represented by formula (1). The phrase "contains substantially no . . . " means for example that the content of the other plasticizer in the resin composition of this invention is 0.1% by weight or less of the weight of compound represented by formula (1). Such other plasticizer is exemplified by the plasticizers described in paragraph [0039] of JP-A-H07-11131, and the plasticizers described in paragraph [0031] of JP-A-2001-302908.

<Characteristics of Resin Composition>

The resin composition of this invention preferably shows a Charpy impact value, observed when formed into an ISO multipurpose test specimen (4 mm thick) and measured in accordance with ISO 179/1eA, larger than a Charpy impact value measured in accordance with ISO 179/1eA shown by an ISO multipurpose test specimen (4 mm thick) that is formed from a resin composition from which the compound represented by formula (1) is excluded, which is preferably 1.5 or more times larger, more preferably 2.0 or more times larger, and even more preferably 3.0 or more times larger. Although the larger the scale factor the better, the scale factor may also be 4.0 times of below, and may even be 3.7 times or below. The Charpy impact value is measured according to the description in EXAMPLES.

<Preferred Embodiments of Resin Composition>

As a preferred embodiment of the resin composition of this invention, exemplified is a resin composition that includes 100 parts by weight of a polyamide resin that includes a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms; 6 to 17 parts by weight of an acid-modified polyolefin having an acid modification ratio of 0.3 to 5% by weight; and 4 to 15 parts by weight of the compound represented by formula (1).

As a more preferred embodiment of the resin composition of this invention, exemplified is a resin composition that includes 100 parts by weight of a polyamide resin that includes a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms; 6 to 17 parts by weight of an acid-modified polyolefin having an acid modification ratio of 0.6 to 5% by weight; and 4 to 15 parts by weight of the compound represented by formula (1).

As a particularly preferred embodiment of the resin composition of this invention, exemplified is a resin composition that includes 100 parts by weight of a polyamide resin that includes a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms; 6 to 17 parts by weight of an acid-modified polyolefin having an acid modification ratio of 0.6 to 5% by weight; and 4 to 15 parts by weight of the compound represented by formula (1), where in formula (1), $R^1$ represents an alkyl group having 3 to 10 carbon atoms, $R^2$ represents an alkyl group having 5 to 12 carbon atoms.

As another embodiment (may occasionally be referred to as "blend embodiment") of the resin composition of this invention, exemplified is the resin composition of this invention wherein the polyamide resin contains 10 to 90 parts by weight of a polyamide resin, in which 70 mol % or more of the structural unit derived from dicarboxylic acid is derived from adipic acid; and 90 to 10 parts by weight of a polyamide resin, in which 70 mol % or more of the structural unit derived from dicarboxylic acid is derived from sebacic acid. With such design, the adhesiveness to the aliphatic polyamide resin (in particular, polyamide 12 and polyamide 11) may further be improved. The ratio of blending of the polyamide resin in which 70 mol % or more of the structural unit derived from dicarboxylic acid is derived from adipic acid, with the polyamide resin in which 70 mol % or more of the structural unit derived from dicarboxylic acid is derived from sebacic acid, is preferably 10 to 90 parts by weight of the former and 90 to 10 parts by weight of the latter, more preferably 30 to 80 parts by weight of the former and 20 to 70 parts by weight of the latter, and even more preferably 50 to 80 parts by weight of the former and 20 to 50 parts by weight of the latter. In this embodiment, the total of the polyamide resin in which 70 mol % or more of the structural unit derived from dicarboxylic acid is derived from adipic acid, and the polyamide resin in which 70 mol % or more of the structural unit derived from dicarboxylic acid is derived from sebacic acid, preferably accounts for 90% by weight or more of the polyamide resin contained in the resin composition of this invention, and more preferably accounts for 95% by weight or more. It is preferable that also the blend embodiment further satisfies the aforementioned preferred embodiment.

<Method for Manufacturing Resin Composition>

Method for manufacturing the resin composition employable here is a matter of free choice. An exemplified method is such as mixing the polyamide resin, the acid-modified polyolefin, the compound represented by formula (1) and any optional other ingredient using a mixing means such as V-type blender to prepare a bulk blend, and then melt-kneading the bulk blend in a vented extruder, followed by pelletizing. Another possible method relates to two-stage kneading by which ingredients other than filler are thoroughly mixed in advance, melt-kneaded in a vented extruder, pelletized, the resultant pellets are mixed with the filler, and the mixture is melt-kneaded in the vented extruder.

In the aforementioned blend embodiment, an exemplified process is such as mixing the polyamide resin in which 70 mol % or more of the structural unit derived from dicarboxylic acid is derived from adipic acid, the polyamide resin in which 70 mol % or more of the structural unit derived from dicarboxylic acid is derived from sebacic acid, the acid-modified polyolefin, the compound represented by formula (1), and any optional other ingredient using a mixing means such as a V-type blender, for bulk blending. It is still alternatively possible to mix, by dry blending, pellets that were obtained after melt-kneading the polyamide resin in which 70 mol % or more of the structural unit derived from dicarboxylic acid is derived from adipic acid, the acid-modified polyolefin, the compound represented by formula (1), and the optional other ingredient, with pellets that were obtained after melt-kneading the polyamide resin in which 70 mol % or more of the structural unit derived from dicarboxylic acid is derived from sebacic acid, the acid-modified polyolefin, the compound represented by formula (1), and any optional other ingredient.

Another exemplary method is such as thoroughly mixing the ingredients other than filler in advance in a V-type blender or the like to prepare a mixture, feeding the mixture through a first chute of a vented twin screw extruder, feeding the filler through a second chute in the middle of the extruder, melt-kneading and then pelletizing the content.

In the screw configuration in a kneading zone of the extruder, an element that promotes kneading is preferably disposed on the upstream side, meanwhile an element capable of increasing pressure is preferably disposed on the downstream side.

The element that promotes kneading is exemplified by forward conveying kneading disk element, orthogonal kneading disk element, wide kneading disk element, and forward conveying mixing screw element.

Heating temperature during the melt-kneading is suitably selectable in the range from 190 to 350° C., depending on melting point of the resin. Too high temperature may tend to promote emission of decomposition gas, possibly causing opacification. It is therefore desirable to select a screw configuration taking shear heating and so forth into consideration. Use of antioxidant or heat stabilizer is desirable, from the viewpoint of suppressing decomposition during kneading or molding in the post-process.

<Molded Article>

The molded article of this invention is obtained by molding the resin composition of this invention. Methods for molding may be any of known methods without special limitation, and may be specifically exemplified by injection molding, blow molding, extrusion molding, compression molding, vacuum forming, press molding, direct blow molding, rotational molding, sandwich molding and two color molding.

The molded article of this invention is widely applicable to fiber, yarn, rope, tube, hose, film sheet, various molding materials, various parts, and finished product. Field of usage is not specifically limited, allowing wide applications including parts of transportation machines such as automobile, general machinery parts, precision machinery parts, electronic/electric equipment parts, OA equipment parts, building/housing equipment parts, medical instruments, leisure and sporting goods, playground equipment, medical supplies, daily goods including food wrapping film, and defense and aerospace products.

<Use as Covering Material>

The resin composition of this invention is, in particular, suitably used as a covering material, not only for its excellent impact resistance, but also for its excellent coverage. The molded article, having the resin composition of this invention used as the covering material, is exemplified by a molded article having a core and a covering layer for the core, wherein the covering layer is formed from the resin composition of this invention.

The core to be covered is widely selectable, without special limitation, from materials which are thin and long, and whose surfaces can be covered with the resin composition of this invention. The materials are exemplified by metal wire, optical waveguide such as optical cable, and continuous hollow articles such as pipe and tube. One exemplary geometry of the core in this invention is given by an average diameter of 50 μm to 1 cm (preferably, 50 μm to 8 mm in average diameter) and a length of 50 cm or longer. This sort of core may, of course, be a continuous hollow article.

The covering layer typically has an average thickness of 100 μm to 1 mm, which is preferably 200 μm to 800 μm.

The resin composition of this invention, notable for its good oxygen barrier performance, is suitable for the covering layer for molded articles which can be used in high temperature atmospheres. The high temperature atmospheres typically have a temperature of 100° C. or above, and further 120° C. or above, with an unspecified upper limit but typically at 140° C. or below. In this invention, a 5 mm diameter core made of polymethyl methacrylate (PMMA), when covered with the resin composition of this invention with an average thickness controlled to 500 μm, and allowed to stand under a high temperature atmosphere for 240 hours, preferably keeps an YI (yellowness index) value which will not vary beyond a range of 5. The YI value here is measured according to a method described later in EXAMPLES.

An optical waveguide as the molded article of this invention is exemplified by an article having a core covered with the resin composition of this invention.

When the molded article of this invention is given as an optical waveguide, the core may be made of any material capable of keeping a function of optical transmission, such as PMMA (polymethyl methacrylate) and glass.

When covering the core, the resin composition may be provided to cover the surface of the core, or, after providing some optional layer such as cladding layer, over the surface of the core, the resin composition of this invention may be provided to cover the surface of the cladding layer. One preferred embodiment of this invention is exemplified by an optical waveguide having the cladding layer over the surface of the core, and further having a layer formed from the resin composition of this invention over the surface of the cladding layer. The cladding layer is typically made of fluorine-containing resin. For details of the fluorine-containing resin used as the cladding layer, descriptions in paragraphs [0041] and [0042] of JP-A-2007-071929, and paragraph [0048] of JP-A-2003-084148 may be taken into account, the contents of which are incorporated by reference into this specification.

Optical fiber cable may be connected to a connector made of an aliphatic polyamide resin such as polyamide 12, depending on mode of usage. Hence, also the resin composition of this invention is occasionally expected to be adhesive to the aliphatic polyamide resin. From the viewpoint of adhesiveness with the aliphatic polyamide resin, the resin composition of this invention is preferably the aforementioned blend embodiment.

One embodiment of the molded article of this invention is exemplified by a molded article having the core, and the covering layer (first covering layer) for the core, wherein the first covering layer is formed from the resin composition of this invention, and further having a second covering layer which adjoins the first covering layer, and contains an aliphatic polyamide resin (preferably at least one of polyamide 11 or polyamide 12, and more preferably polyamide 12) as a major ingredient. The first covering layer is formed from the resin composition of this invention. In particular, the polyamide resin contained in the resin composition preferably contains 10 to 90 parts by weight of polyamide resin in which 70 mol % or more of the structural unit derived from dicarboxylic acid is derived from adipic acid, and 90 to 10 parts by weight of polyamide resin in which 70 mol % or more of the structural unit derived from dicarboxylic acid is derived from sebacic acid.

Now the phrase "contains an aliphatic polyamide resin as a major ingredient" means that a resin component whose content is largest of all ingredients contained in the second covering layer is the aliphatic polyamide resin. The aliphatic polyamide resin preferably accounts for 80% by weight or more of the resin components contained in the second covering layer.

The second covering layer may be an outer layer of the first covering layer, or may be an inner layer of the first covering layer. The second covering layer is preferably the outer layer of the first covering layer. With such outer layer, the obtainable molded article will be highly resistant to sulfuric acid. When the first covering layer is provided with the second covering layer as the outer layer, the first covering layer may also have, as the inner layer, a covering layer that contains an aliphatic polyamide resin as a major ingredient.

The second covering layer may be blended with polyamide resin other than the aliphatic polyamide resin, modified polyolefin, other thermoplastic resin, various additives, or reinforcing material such as glass fiber. For details, descriptions in paragraphs [0018] to [0025] of WO2015/022818 pamphlet may be taken into account, the contents of which may be incorporated by reference into this specification. Regarding the layer structure and methods for forming the first covering layer and the second covering layer, descriptions in paragraphs [0051] to [0054] of WO2015/022818 pamphlet may be taken into account, the contents of which may be incorporated by reference into this specification.

EXAMPLES

This invention will further be detailed below referring to Examples. Materials, amounts of consumption, ratios, details of processes, process procedures and so forth mentioned in Examples below may be modified appropriately without departing from the spirit of this invention. The scope of this invention is therefore not limited to the specific Examples below.

<Synthesis of Polyamide Resin (MXD6)>

To 8.9 kg of adipic acid, added were 0.3 g of sodium hypophosphite monohydrate and 0.1 g of sodium acetate, the content was allowed to melt in a reaction can at 0.1 MPaA under heating at 170° C. and kept stirred, 8.3 kg of metaxylylenediamine (from Mitsubishi Gas Chemical Company) was then slowly added dropwise over two hours, and the temperature was elevated up to 250° C. After the temperature was elevated, the pressure was slowly reduced over one hour down to 0.08 MPaA, and kept for 0.5 hours. After completion of the reaction, the content was taken out in the form of strands, and pelletized through a pelletizer to obtain 15 kg of pellets. The obtained pellets were placed in a jacketed tumbler (rotary vacuum chamber) that employs a heat medium for heating, and heated at 200° C. under reduced pressure (0.5 to 10 Torr) for one hour, so as to allow the pellets to polymerize in solid phase, to thereby obtain polyamide resin (MXD6). The thus obtained MXD6 was found to have a melting point of 237° C.

<Synthesis of Polyamide Resin (MP6)>

To 8.9 kg of adipic acid, added were 0.3 g of sodium hypophosphite monohydrate and 0.1 g of sodium acetate, the content was allowed to melt in a reaction can at 0.1 MPaA under heating at 170° C. and kept stirred, 8.3 kg of xylylenediamine (mixed diamine of paraxylylenediamine and metaxylylenediamine, with a molar ratio of 3:7, from Mitsubishi Gas Chemical Company) was then slowly added dropwise over two hours, and the temperature was elevated up to 270° C. After the temperature was elevated, the pressure was slowly reduced down to 0.08 MPaA over one hour, and kept for 0.5 hours. After completion of the reaction, the content was taken out in the form of strands, and pelletized through a pelletizer to obtain 15 kg of pellets. The obtained pellets were placed in a jacketed tumbler (rotary vacuum chamber) that employs a heat medium for heating, and heated at 200° C. under reduced pressure (0.5 to 10 Torr) for one hour, so as to allow the pellets to polymerize in solid phase, to thereby obtain polyamide resin (MP6). The thus obtained MP6 was found to have a melting point of 254° C.

<Synthesis of Polyamide Resin (MXD10)>

To 10.00 kg of sebacic acid, added were 7.7 g of sodium hypophosphite monohydrate and 4.0 g of sodium acetate, the content was allowed to melt in a reaction can at 0.1 MPaA under heating at 170° C. and kept stirred, 6.69 kg of metaxylylenediamine was then slowly added dropwise over two hours, and the temperature was elevated up to 250° C. After the temperature was elevated, the pressure was slowly reduced down to 0.08 MPaA over one hour, and kept for 0.5 hours. After completion of the reaction, the content was taken out in the form of strands, and pelletized through a pelletizer to obtain 15 kg of polyamide resin (MXD10) pellets. The thus obtained MXD10 was found to have a melting point of 190° C.

<Synthesis of Polyamide Resin (MP10)>

To 10.00 kg of sebacic acid, added were 7.7 g of sodium hypophosphite monohydrate and 4.0 g of sodium acetate, the content was allowed to melt in a reaction can at 0.1 MPaA under heating at 170° C. and kept stirred, 6.68 kg of xylylenediamine (mixed diamine of paraxylylenediamine and metaxylylenediamine, with a molar ratio of 3:7, from Mitsubishi Gas Chemical Company) was then slowly added dropwise over two hours, and the temperature was elevated up to 250° C. After the temperature was elevated, the pressure was slowly reduced down to 0.08 MPaA over one hour, and kept for 0.5 hours. After completion of the reaction, the content was taken out in the form of strands, and pelletized through a pelletizer to obtain 15 kg of polyamide resin (MP10) pellets. The thus obtained MP10 was found to have a melting point of 215° C.

<Other Polyamide Resin>

PA12: polyamide 12, product number: X7393, from Daicel-Evonik Ltd.

<Acid-Modified Polyolefins>

Tafmer MH5020: maleic anhydride modification ratio=1.0% by weight, from Mitsubishi Chemical Corporation, α-olefin with 4 carbon atoms Tafmer MH5010: maleic anhydride modification ratio=0.5% by weight, from Mitsubishi Chemical Corporation, α-olefin with 4 carbon atoms Tafmer MH5040: maleic anhydride modification ratio=2.0% by weight, from Mitsubishi Chemical Corporation, α-olefin with 4 carbon atoms Tafmer DF610: non-acid-modified polyolefin, from Mitsubishi Chemical Corporation, α-olefin with 4 carbon atoms ZeMacE60: maleic anhydride modification ratio 50% by weight, from Vertellus, α-olefin with 0 carbon atoms <Measurement of Acid Modification Ratio>

To 0.15 g of a sample (acid-modified polyolefin), added was 30 mL of xylene, and the content was heated to 100° C. to dissolve the sample. After the sample was dissolved, 2 mL of ethanol and an indicator (phenolphthalein solution) were added, and the mixture was subjected to neutralization titration using a 0.1 N potassium hydroxide solution in methanol as a titrant. Blank not containing the sample was titrated in the same way, and the ratio of modification with acid derivative was calculated using the equation below:

Ratio of modification with acid derivative (% by weight)=$(A-B) \times f \times 100 / C / 2 / 1000000 \times D \times 100$ (A: titration volume (mL), B: blank titration volume (mL), f: factor of titrant, C: sample weight (g), D: molecular weight of acid derivative unit).

The titrant used above had a factor f of 1.005.

<Compound Represented by Formula (1)>

HD-PB: hexyldecyl p-hydroxybenzoate, Exceparl HD-PB from KAO Corporation,

EH-PB: ethylhexyl p-hydroxybenzoate, obtained from Tokyo Chemical Industry Co., Ltd.

EH-OB: ethylhexyl o-hydroxybenzoate, obtained from Tokyo Chemical Industry Co., Ltd.

Example 1

The polyamide resin, the acid-modified polyolefin and the compound represented by formula (1), all listed in Table 1, were precisely weighed according to the amounts (parts by weight) again listed in Table 1, blended in a tumbler, fed into a twin screw extruder (TEM37BS, from Toshiba Machine Co., Ltd.) from the base, allowed to melt and extruded, the resultant strands were air-cooled on a net belt, and then pelletized to obtain pellets of a polyamide resin composition. Extrusion temperature of the extruder was set 20° C. higher than the melting point of the polyamide resin.

<Manufacture of Covered Article>

A 5-mm diameter core made of PMMA was covered with molten pellets of the polyamide resin composition obtained above, using a resin coating apparatus having one extruder and a cross-head die. Temperature of the extruder was set 20° C. higher than the melting point of the polyamide resin. The covering layer was found to have an average thickness of 500 μm, and the obtained covered article was found to have an average diameter of 6 mm, and a length of 1 m.

<Evaluation of Oxygen Barrier Performance>

The covered article obtained above were closed at both ends using Swagelok joints, and allowed to stand still in an oven preset at 130° C. for 240 hours. After the testing, the covering layer was removed to take out the core only, the tested core was cut into a pellet of 5 mm long, and subjected to measurement of YI value in accordance with JIS K7373. The core was represented by "o" if the difference of YI value between before and after testing (ΔYI) was 5 or smaller, and by "x" if exceeding 5. The higher the oxygen barrier performance, the lesser oxygen permeates to reach the core, thereby the YI value can be kept low.

A color difference meter (Z-Σ80 Color Measuring System, from Nippon Denshoku Industries Co., Ltd.) was used for measuring the YI value.

<Evaluation of Impact Resistance>

The polyamide resin composition pellets obtained above were injection molded to produce an ISO multipurpose test specimen (4 mm thick), using an injection molding machine (Model SE130DU-HP, from Sumitomo Heavy Industries, Ltd.), while setting the cylinder temperature 20° C. higher than the melting point of the polyamide resin, under conditions including a die temperature of 130° C. and a molding cycle time of 55 seconds. The thus obtained ISO multipurpose test specimen was measured regarding Charpy impact value in accordance with ISO 179/1eA.

<Evaluation of Coverage>

The covered article (1 m long) obtained above was cut into a sample of 10 cm long. The 10 cm long sample was measured regarding the thickness of the covering layer in a cross sectional view, along the circumferential direction of the core, using a digital microscope from AnMo Electronics Corporation. Evaluation was made as follow:

o: no portion with a thickness of 400 μm or thinner found in covering layer; and x: portion with a thickness of 400 μm or thinner found in covering layer.

Examples 2 to 12 and Comparative Examples 2 to 7

The processes were conducted in the same way as in Example 1, except that the amounts of addition and types of the polyamide resin, the acid-modified polyolefin, and the compound represented by formula (1) were changed as listed in Tables 1 to 3.

Those showing no fracture in the evaluation of impact resistance were indicated by "N.B."

Comparative Example 5 showed remarkable increase in viscosity, and the extrusion molding resulted in failure.

Comparative Example 1

The processes and evaluation were conducted in the same way as in Example 1, except that PA12 was used as the polyamide resin.

Examples 13 to 15

The polyamide resin composition pellets obtained in the individual Examples were dry blended according to the ratios by weight listed in Table 4. The dry blends were molded in the same way as in Example 1, and evaluated regarding oxygen barrier performance, Charpy impact value and coverage. Also adhesiveness with polyamide 12 (PA12) was evaluated by a method described below. Also Example 2 was evaluated regarding the adhesiveness with PA12, and summarized in Table 4 together with Examples 13 to 15.

<Evaluation of Adhesiveness with PA12>

The polyamide resin composition pellets were injection molded, using an injection molding machine (Model SE130DU-HP, from Sumitomo Heavy Industries, Ltd.), while setting the cylinder temperature 20° C. higher than the melting point of the polyamide resin, under the conditions including a die temperature of 130° C. and a molding cycle time of 120 seconds, to thereby produce a test specimen of 55 mm wide, 110 mm long and 3 mm thick (numbered "1"

in FIG. 1, described later). Also polyamide 12 pellets (product number: AZM30 T6LD, from Arkema K.K.) was injection molded in the same way, under conditions including a cylinder temperature of (240°) C, a die temperature of (80°) C and a molding cycle time of (120) seconds, to thereby produce a test specimen of 55 mm wide, 110 mm long and 3 mm thick (numbered "2" in FIG. 1, described later).

The thus obtained two test specimens were adjoined while bringing their longer sides (longitudinal direction) in contact as illustrated in FIG. 1(*a*), and vibration welded for two seconds using a vibration welder/tester (VWMAC-103, Branson Ultrasonics Corporation), at a number of vibration of 240 Hz and a vibration width of 1.5 mm, under a pressure of 1 MPa, to thereby produce a welded test specimen of 3 mm thick. In FIG. 1, arrow 3 indicates the direction of vibration, and arrow 4 indicates the direction of welding pressure.

The obtained welded test specimen was cut into a piece of 20 mm wide as illustrated in FIG. 1(*b*), and the piece was subjected to three-point bending test, with the interface positioned at the center, while setting an inter-fulcrum distance of 64 mm. The adhesiveness with polyamide 12 was evaluated on the basis of the load under which the interface breaks. More specifically, the specimen was represented by "x" if the interface breaks under load below 50 N, and by "0" under load above 50 N.

TABLE 1

| | | | | Example | | | | | |
|---|---|---|---|---|---|---|---|---|---|
| | | | | 1 | 2 | 3 | 4 | 5 | 6 |
| Composition of Resin Composition | Polyamide Resin | Diamine-Derived structural Unit | Metaxylylenediamine | 100 | 100 | 100 | 100 | 100 | 100 |
| | | | Paraxylylenediamine | 0 | 0 | 0 | 0 | 0 | 0 |
| | | Dicarboxylic Acid-Derived structural Unit | Adipic Acid | 100 | 100 | 100 | 100 | 100 | 100 |
| | | | Sebacic Acid | 0 | 0 | 0 | 0 | 0 | 0 |
| | | Amounts of Addition (Parts by weigt) | | 100 | 100 | 100 | 100 | 100 | 100 |
| | Acid-Modified Polyolefin | Types | | Tafmer MH5020 | Tafmer MH5020 | Tafmer MH5020 | Tafmer MH5020 | Tafmer MH5020 | Tafmer MH5010 |
| | | Amounts of Addition (Parts by weigt) | | 10 | 10 | 10 | 5 | 15 | 10 |
| | Compound Represented by Formula (1) | Types | | HD-PB | HD-PB | HD-PB | HD-PB | HD-PB | HD-PB |
| | | Amounts of Addition (Parts by weigt) | | 3 | 8 | 13 | 8 | 8 | 8 |
| Evaluation of Oxygen Barrier Performance | | | | ○ | ○ | ○ | ○ | ○ | ○ |
| Charpy Impact Strength (Notched) (kJ/m$^2$) | | | | 38 | 48 | 64 | 37 | 66 | 40 |
| Evaluation of Coverage | | | | ○ | ○ | ○ | ○ | ○ | ○ |

TABLE 2

| | | | | Example | | | | | |
|---|---|---|---|---|---|---|---|---|---|
| | | | | 7 | 8 | 9 | 10 | 11 | 12 |
| Composition of Resin Composition | Polyamide Resin | Diamine-Derived structural Unit | Metaxylylenediamine | 100 | 70 | 100 | 70 | 100 | 100 |
| | | | Paraxylylenediamine | 0 | 30 | 0 | 30 | 0 | 0 |
| | | Dicarboxylic Acid-Derived structural Unit | Adipic Acid | 100 | 100 | 0 | 0 | 100 | 100 |
| | | | Sebacic Acid | 0 | 0 | 100 | 100 | 0 | 0 |
| | | Amounts of Addition (Parts by weigt) | | 100 | 100 | 100 | 100 | 100 | 100 |
| | Acid-Modified Polyolefin | Types | | Tafmer MH5040 | Tafmer MH5020 | Tafmer MH5020 | Tafmer MH5020 | Tafmer MH5020 | Tafmer MH5020 |
| | | Amounts of Addition (Parts by weigt) | | 10 | 10 | 10 | 10 | 10 | 10 |
| | Compound Represented by Formula (1) | Types | | HD-PB | HD-PB | HD-PB | HD-PB | EH-PB | EH-OB |
| | | Amounts of Addition (Parts by weigt) | | 8 | 8 | 8 | 8 | 8 | 8 |
| Evaluation of Oxygen Barrier Performance | | | | ○ | ○ | ○ | ○ | ○ | ○ |
| Charpy Impact Strength (Notched) (kJ/m$^2$) | | | | 52 | 46 | N.B. | N.B. | 44 | 43 |
| Evaluation of Coverage | | | | ○ | ○ | ○ | ○ | ○ | ○ |

TABLE 3

| | | | | Comparative Example | | | | | | |
|---|---|---|---|---|---|---|---|---|---|---|
| | | | | 1 | 2 | 3 | 4 | 5 | 6 | 7 |
| Composition of Resin Composition | Polyamide Resin | Diamine-Derived structural Unit | Metaxylylenediamine | — | 100 | 100 | 100 | 100 | 100 | 100 |
| | | | Paraxylylenediamine | — | 0 | 0 | 0 | 0 | 0 | 0 |
| | | Dicarboxylic Acid-Derived structural Unit | Adipic Acid | — | 100 | 100 | 100 | 100 | 100 | 100 |
| | | | Sebacic Acid | — | 0 | 0 | 0 | 0 | 0 | 0 |
| | | Amounts of Addition (Parts by weigt) | | — | 100 | 100 | 100 | 100 | 100 | 100 |
| | Acid-Modified Polyolefin | Types | | Tafmer MH5020 | Tafmer MH5020 | Tafmer MH5020 | Tafmer DF610 | ZeMac E60 | — | Tafmer MH5020 |
| | | Amounts of Addition (Parts by weigt) | | 10 | 10 | 10 | 10 | 10 | — | 20 |
| | Compound Represented by Formula (1) | Types | | HD-PB | — | HD-PB | HD-PB | HD-PB | HD-PB | HD-PB |
| | | Amounts of Addition (Parts by weigt) | | 8 | — | 18 | 8 | 8 | 8 | 8 |
| Evaluation of Oxygen Barrier Performance | | | | x | ○ | x | ○ | — | ○ | x |
| Charpy Impact Strength (Notched) (kJ/m²) | | | | N.B. | 14 | 78 | 20 | — | 7 | N.B. |
| Evaluation of Coverage | | | | ○ | ○ | ○ | x | — | ○ | x |

TABLE 4

| | Example 2 | Example 13 | Example 14 | Example 15 |
|---|---|---|---|---|
| Composition of Resin Composition | Composition of Example 2 | 100 | 70 | 50 | 70 |
| | Composition of Example 9 | 0 | 30 | 50 | 0 |
| | Composition of Example 10 | 0 | 0 | 0 | 30 |
| Evaluation of Oxygen Barrier Performance | ○ | ○ | ○ | ○ |
| Charpy Impact Strength (Notched) (kJ/m²) | 38 | 45 | 52 | 42 |
| Evaluation of Coverage | ○ | ○ | ○ | ○ |
| Adhesiveness with PA12 | x | ○ | ○ | ○ |

As is clear from these results, the resin compositions of this invention were found to distinctively improve the impact resistance while keeping good oxygen barrier performance (Examples 1 to 12). Also those excel in the coverage were obtained (Examples 1 to 12).

In contrast, when PA12 was used as the polyamide resin (Comparative Example 1), the oxygen barrier performance was found to be poor despite good impact resistance.

Also when the compound represented by formula (1) was not used (Comparative Example 2), the impact resistance was found to be markedly poor despite good oxygen barrier performance. Comparative Example 2 was found to show very low impact resistance, although the acid-modified polyolefin, known as an impact resistance modifier, was added according to the same ratio as in Examples 2 and 3. It is therefore understood that the effect of this invention is beyond expectations.

Meanwhile, when the compound represented by formula (1) was added excessively (Comparative Example 3), the oxygen barrier performance was found to be poor despite good impact resistance.

When the non-acid-modified polyolefin was used (Comparative Example 4), the impact resistance was found to be poor despite good oxygen barrier performance. Also the coverage was found to be poor.

When the polyolefin with a high acid modification ratio was used (Comparative Example 5), the viscosity remarkably increased, and the extrusion molding resulted in failure.

When the acid-modified polyolefin was not added (Comparative Example 6), the impact resistance was found to be poor despite good oxygen barrier performance.

When the acid-modified polyolefin was added excessively (Comparative Example 7), the oxygen barrier performance was found to be poor despite good impact resistance. Also the coverage was found to be poor.

When the polyamide resins, having adipic acid as the structural unit derived from dicarboxylic acid and having sebacic acid as the structural unit derived from dicarboxylic acid, were blended, obtainable were the polyamide resin compositions that excel in adhesiveness with polyamide 12, while keeping high levels of good oxygen barrier performance, impact resistance and coverage (Examples 13 to 15 as compared with Example 2).

The resin composition of this invention can keep high oxygen barrier performance and can achieve high impact resistance, and is suitably used for various molded articles.

The resin composition of this invention also excels in coverage. Polyamide 11 (PA11) and polyamide 12 (PA12), featured by their good impact resistance and coverage, have been used typically as a covering material for optical waveguide. The optical waveguide have however occasionally suffered from poor oxygen barrier performance, when used in high temperature atmospheres. Now the resin composition of this invention, featured by its good oxygen barrier performance, impact resistance, as well as coverage, is suitably used as a covering material that is employable in high temperature atmospheres.

REFERENCE SIGNS LIST

1 Test specimen formed from pellets of polyamide resin composition pellets of this invention
2 Test specimen formed from polyamide 12 pellets
3 Arrow indicating direction of vibration of vibration welder/tester
4 Arrow indicating direction of welding pressure in vibration welding

The invention claimed is:

1. A resin composition comprising:
   100 parts by weight of a polyamide resin comprising a structural unit derived from diamine and a structural unit derived from dicarboxylic acid, in which 70 mol % or more of the structural unit derived from diamine is derived from xylylenediamine, and in which 70 mol % or more of the structural unit derived from dicarboxylic acid is derived from a straight-chain aliphatic α,ω-dicarboxylic acid having 4 to 20 carbon atoms;
   3 to 17 parts by weight of an acid-modified polyolefin having an acid modification ratio of 0.3 to 5.0% by weight; and
   1 to 15 parts by weight of a compound represented by formula (1) below;

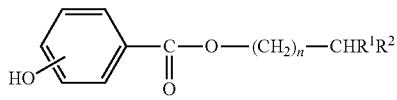

Formula (1)

wherein $R^1$ represents an alkyl group having 1 to 10 carbon atoms, $R^2$ represents an alkyl group having 2 to 12 carbon atoms, and n represents an integer of 1 to 3.

2. The resin composition of claim 1, wherein the xylylenediamine contains at least one of metaxylylenediamine or paraxylylenediamine.

3. The resin composition of claim 1, wherein the straight-chain aliphatic α,ω-dicarboxylic acid having 4 to 20 carbon atoms contains at least one of sebacic acid and adipic acid.

4. The resin composition of claim 1, wherein the compound represented by formula (1) and the acid-modified polyolefin having an acid modification ratio of 0.3 to 5% by weight satisfy a weight ratio of 3:10 to 16:10.

5. The resin composition of claim 1, wherein the acid-modified polyolefin contains at least one of maleic acid-modified polyolefin and maleic anhydride-modified polyolefin.

6. The resin composition of claim 1, wherein the polyamide resin contains:
   10 to 90 parts by weight of a polyamide resin, in which 70 mol % or more of the structural unit derived from dicarboxylic acid is derived from adipic acid; and
   90 to 10 parts by weight of a polyamide resin, in which 70 mol % or more of the structural unit derived from dicarboxylic acid is derived from sebacic acid.

7. The resin composition of claim 1, being a covering material for a core.

8. A molded article obtained by molding the resin composition of claim 1.

9. A molded article comprising a core and a covering layer for the core, the covering layer being formed from the resin composition of claim 1.

10. The molded article of claim 9, further comprising a second covering layer which is in contact with the covering layer, and contains an aliphatic polyamide resin as a major ingredient.

11. The molded article of claim 10, wherein the aliphatic polyamide resin is polyamide 12.

12. The molded article of claim 10, wherein the polyamide resin that composes the covering layer contains:
   10 to 90 parts by weight of a polyamide resin, in which 70 mol % or more of the structural unit derived from dicarboxylic acid is derived from adipic acid; and
   90 to 10 parts by weight of a polyamide resin, in which 70 mol % or more of the structural unit derived from dicarboxylic acid is derived from sebacic acid.

13. The molded article of claim 9, wherein the core is an optical waveguide or a continuous hollow article.

14. A method for manufacturing a molded article comprising covering a core with the resin composition of claim 1.

15. The resin composition of claim 2, wherein the straight-chain aliphatic α,ω-dicarboxylic acid having 4 to 20 carbon atoms contains at least one of sebacic acid and adipic acid.

16. The resin composition of claim 2, wherein the compound represented by formula (1) and the acid-modified polyolefin having an acid modification ratio of 0.3 to 5% by weight satisfy a weight ratio of 3:10 to 16:10.

17. The resin composition of claim 2, wherein the acid-modified polyolefin contains at least one of maleic acid-modified polyolefin and maleic anhydride-modified polyolefin.

18. The resin composition of claim 2, wherein the polyamide resin contains:
   10 to 90 parts by weight of a polyamide resin, in which 70 mol % or more of the structural unit derived from dicarboxylic acid is derived from adipic acid; and
   90 to 10 parts by weight of a polyamide resin, in which 70 mol % or more of the structural unit derived from dicarboxylic acid is derived from sebacic acid.

19. The resin composition of claim 2, being a covering material for a core.

20. A molded article obtained by molding the resin composition of claim 2.

21. A molded article comprising a core and a covering layer for the core, the covering layer being formed from the resin composition of claim 2.

22. The molded article of claim 21, further comprising a second covering layer which is in contact with the covering layer, and contains an aliphatic polyamide resin as a major ingredient.

23. The molded article of claim 22, wherein the aliphatic polyamide resin is polyamide 12.

24. The molded article of claim 22, wherein the polyamide resin that composes the covering layer contains:
   10 to 90 parts by weight of a polyamide resin, in which 70 mol % or more of the structural unit derived from dicarboxylic acid is derived from adipic acid; and
   90 to 10 parts by weight of a polyamide resin, in which 70 mol % or more of the structural unit derived from dicarboxylic acid is derived from sebacic acid.

25. The molded article of claim 21, wherein the core is an optical waveguide or a continuous hollow article.

26. A method for manufacturing a molded article comprising covering a core with the resin composition of claim 2.

* * * * *